United States Patent
Heggebø et al.

(10) Patent No.: US 12,473,144 B2
(45) Date of Patent: Nov. 18, 2025

(54) CONTAINER HANDLING VEHICLE WITH INCREASED STABILITY

(71) Applicant: Autostore Technology AS, Nedre Vats (NO)

(72) Inventors: Jørgen Djuve Heggebø, Ølen (NO); Kenneth Müller, Vormedal (NO)

(73) Assignee: AutoStore Technology AS, Nedre Vats (NO)

( * ) Notice: Subject to any disclaimer, the term of this patent is extended or adjusted under 35 U.S.C. 154(b) by 291 days.

(21) Appl. No.: 18/247,947

(22) PCT Filed: Oct. 18, 2021

(86) PCT No.: PCT/EP2021/078770
§ 371 (c)(1),
(2) Date: Apr. 5, 2023

(87) PCT Pub. No.: WO2022/084229
PCT Pub. Date: Apr. 28, 2022

(65) Prior Publication Data
US 2023/0382642 A1 Nov. 30, 2023

(30) Foreign Application Priority Data
Oct. 22, 2020 (NO) .................................. 20201142

(51) Int. Cl.
*B65G 1/04* (2006.01)
(52) U.S. Cl.
CPC .... *B65G 1/0464* (2013.01); *B65G 2201/0235* (2013.01)
(58) Field of Classification Search
CPC .......... B65G 1/0464; B65G 2201/0235; B66C 23/74
(Continued)

(56) References Cited

U.S. PATENT DOCUMENTS 11,420,822 B2 * 8/2022 Fjeldheim ............ B65G 1/0464

FOREIGN PATENT DOCUMENTS

| CN | 201713228 U | 1/2011 |
| CN | 203095491 U | 7/2013 |

(Continued)

OTHER PUBLICATIONS

International Search Report issued in PCT/EP2021/078770 on Feb. 4, 2022 (6 pages).
(Continued)

*Primary Examiner* — James Keenan
(74) *Attorney, Agent, or Firm* — Baker Botts L.L.P.

(57) ABSTRACT

A container handling vehicle operates on a two-dimensional rail system. The two-dimensional rail system includes a first set of parallel rails arranged to guide movement of container handling vehicles in a first direction across the top of a frame structure, and a second set of parallel rails arranged perpendicular to the first set of rails to guide movement of the container handling vehicles in a second direction which is perpendicular to the first direction. The container handling vehicle includes a wheel base unit, a support section, a cantilever section, a lifting frame, four guiding sheaves, four lifting bands, a lifting shaft, and a lifting device motor. The wheel base unit includes first and second sets of wheels for guiding the container handling vehicle along the rail system in the first and second directions respectively. The support section extends vertically from the wheel base unit. The support section has a footprint with a horizontal extent. The cantilever section extends from the support section. The lifting frame is suspended in a horizontal orientation from the cantilever section by a plurality of lifting bands. The lifting frame includes a releasable connection for connecting to a storage container. The guiding sheaves are provided in the cantilever section. Each of the guiding sheaves are (Continued)

arranged for guiding and supporting one of the four plurality of lifting bands and the lifting frame. The lifting shaft for winding up and unwinding the plurality of lifting bands. The lifting device motor rotates the at least one lifting shaft. A first and second wheel in a first pair of wheels in the first set of wheels are arranged closer to the cantilever section than a third and fourth wheel in a second pair of wheels of the first set of wheels. At least one of the lifting shaft and the lifting device motor are arranged closer to the third and fourth wheel than the first and second wheel in the first set of wheels. At least one of the lifting shaft and the lifting device motor is arranged within the wheel base unit.

20 Claims, 7 Drawing Sheets

(58) Field of Classification Search
USPC .......................................................... 414/626
See application file for complete search history.

(56) References Cited

FOREIGN PATENT DOCUMENTS

| CN | 203128099 | U | | 8/2013 | | |
|---|---|---|---|---|---|---|
| CN | 111422547 | A | * | 7/2020 | ........... | B65G 1/0464 |
| NO | 317366 | B1 | | 10/2004 | | |
| WO | 2014/075937 | A1 | | 5/2014 | | |
| WO | 2014/090684 | A1 | | 6/2014 | | |
| WO | 2015/193278 | A1 | | 12/2015 | | |
| WO | 2018/146304 | A1 | | 8/2018 | | |
| WO | WO-2019101725 | A1 | * | 5/2019 | ........... | B65G 1/0464 |
| WO | 2019/137870 | A1 | | 7/2019 | | |
| WO | 2019/206437 | A1 | | 10/2019 | | |
| WO | 2019/238703 | A1 | | 12/2019 | | |
| WO | 2020/094337 | A1 | | 5/2020 | | |
| WO | 2020/094339 | A1 | | 5/2020 | | |

OTHER PUBLICATIONS

Written Opinion of the International Searching Authority issued in PCT/EP2021/078770 on Feb. 4, 2022 (8 pages).

Norwegian Search Report issued in NO 20201142, dated Apr. 13, 2021 (2 pages).

Thibaut, Charles, Office Action for European Patent Application No. 21798590.2, dated May 5, 2025, 6 pages, pub. by the EPO, Rijswijk Netherlands.

Wang, Jinming, Office Action in CN202180072350.7, mailed Sep. 17, 2025, 13 pages, The State Intellectual Property Office of the People's Republic of China, Beijing, China.

* cited by examiner

CONTAINER HANDLING VEHICLE WITH INCREASED STABILITY

FIELD OF THE INVENTION

The present invention relates to an automated storage and retrieval system for storage and retrieval of containers, in particular to a container handling vehicle for use in such a system, where the container handling vehicle has increased stability compared to prior art solutions.

BACKGROUND AND PRIOR ART

Figure 1:
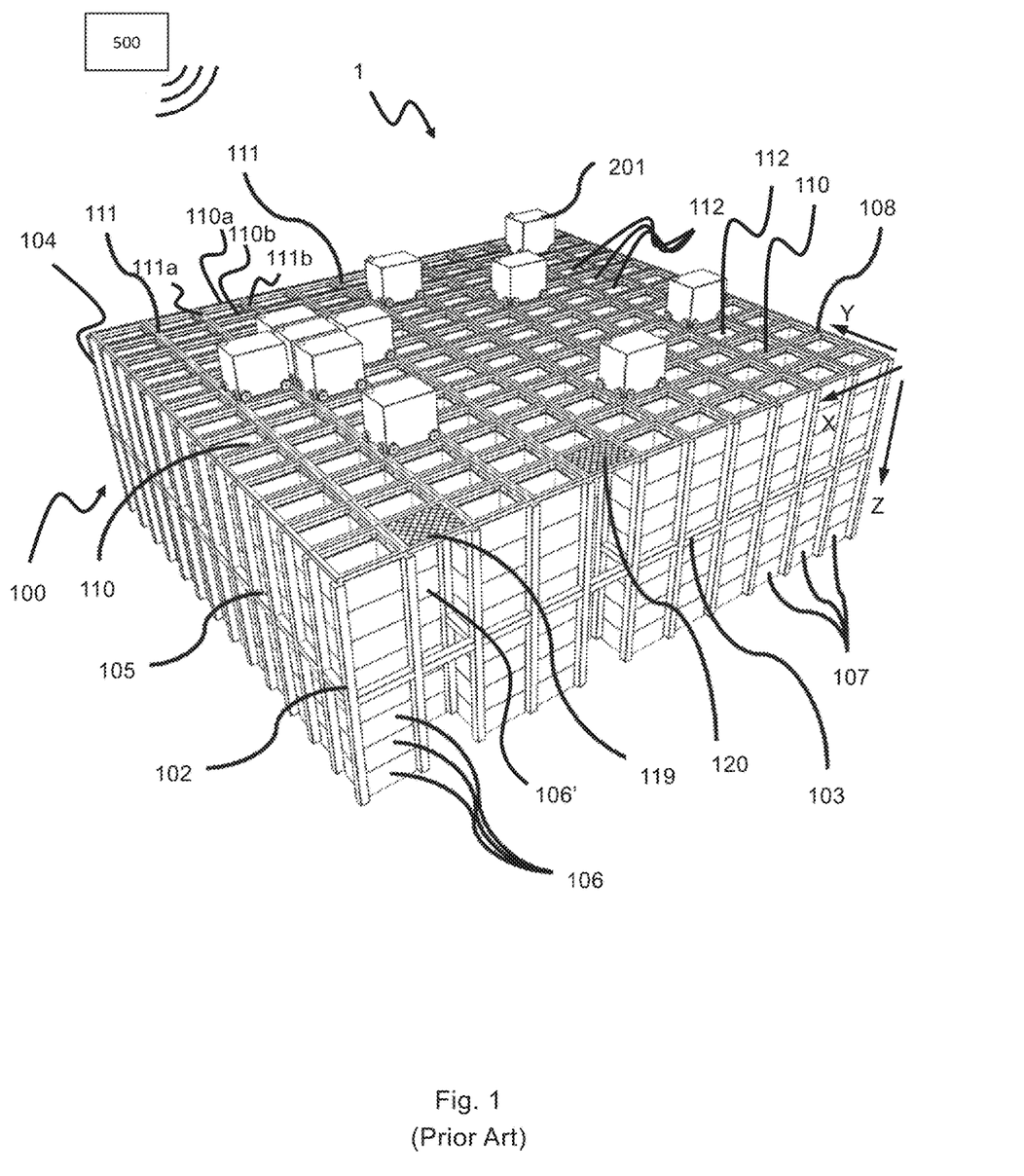
FIG. 1 is a perspective view of a framework structure of a prior art automated storage and retrieval system.
Figure 2:
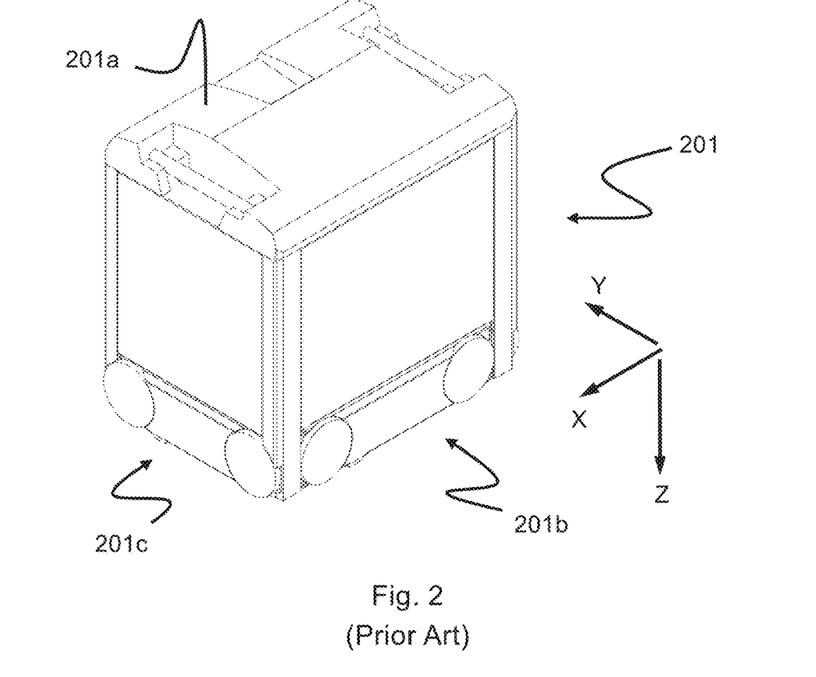
FIG. 2 is a perspective view of a prior art container handling vehicle having a centrally arranged cavity for carrying storage containers therein.
Figure 3A:
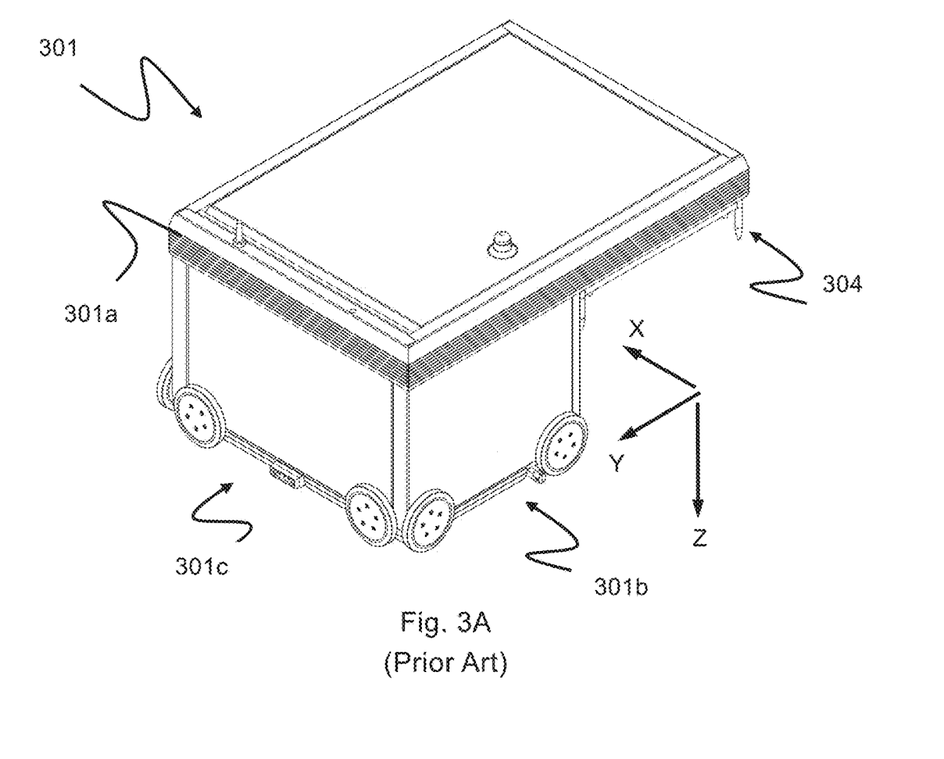
FIG. 3A is a perspective view of a prior art container handling vehicle having a cantilever for carrying storage containers underneath.

FIG. 1 discloses a typical prior art automated storage and retrieval system 1 with a framework structure 100 and FIGS. 2 and 3 disclose two different prior art container handling vehicles 201,301 suitable for operating on such a system 1.

The framework structure 100 comprises upright members 102, horizontal members 103 and a storage volume comprising storage columns 105 arranged in rows between the upright members 102 and the horizontal members 103. In these storage columns 105 storage containers 106, also known as bins, are stacked one on top of one another to form stacks 107. The members 102, 103 may typically be made of metal, e.g. extruded aluminum profiles.

The framework structure 100 of the automated storage and retrieval system 1 comprises a rail system 108 arranged across the top of framework structure 100, on which rail system 108 a plurality of container handling vehicles 201, 301 are operated to raise storage containers 106 from, and lower storage containers 106 into, the storage columns 105, and also to transport the storage containers 106 above the storage columns 105. The rail system 108 comprises a first set of parallel rails 110 arranged to guide movement of the container handling vehicles 201,301 in a first direction X across the top of the frame structure 100, and a second set of parallel rails 111 arranged perpendicular to the first set of rails 110 to guide movement of the container handling vehicles 201,301 in a second direction Y which is perpendicular to the first direction X. Containers 106 stored in the columns 105 are accessed by the container handling vehicles through access openings 112 in the rail system 108. The container handling vehicles 201,301 can move laterally above the storage columns 105, i.e. in a plane which is parallel to the horizontal X-Y plane.

The upright members 102 of the framework structure 100 may be used to guide the storage containers during raising of the containers out from and lowering of the containers into the columns 105. The stacks 107 of containers 106 are typically self-supportive.

Each prior art container handling vehicle 201,301 comprises a vehicle body 201a,301a, and first and second sets of wheels 201b,301b,201c,301c which enable the lateral movement of the container handling vehicles 201,301 in the X direction and in the Y direction, respectively. In FIGS. 2 and 3 two wheels in each set are fully visible. The first set of wheels 201b,301b is arranged to engage with two adjacent rails of the first set 110 of rails, and the second set of wheels 201c,301c is arranged to engage with two adjacent rails of the second set 111 of rails. At least one of the sets of wheels 201b,301b,201c,301c can be lifted and lowered, so that the first set of wheels 201b,301b and/or the second set of wheels 201c,301c can be engaged with the respective set of rails 110, 111 at any one time.

Each prior art container handling vehicle 201,301 also comprises a lifting device (not shown) for vertical transportation of storage containers 106, e.g. raising a storage container 106 from, and lowering a storage container 106 into, a storage column 105. The lifting device comprises one or more gripping/engaging devices which are adapted to engage a storage container 106, and which gripping/engaging devices can be lowered from the vehicle 201,301 so that the position of the gripping/engaging devices with respect to the vehicle 201,301 can be adjusted in a third direction Z which is orthogonal the first direction X and the second direction Y. Parts of the gripping device of the container handling vehicle 301 are shown in FIG. 3 indicated with reference number 304. The gripping device of the container handling device 201 is located within the vehicle body 301a in FIG. 2.

Conventionally, and also for the purpose of this application, Z=1 identifies the uppermost layer of storage containers, i.e. the layer immediately below the rail system 108, Z=2 the second layer below the rail system 108, Z=3 the third layer etc. In the exemplary prior art disclosed in FIG. 1, Z=8 identifies the lowermost, bottom layer of storage containers. Similarly, X=1 . . . n and Y=1 . . . n identifies the position of each storage column 105 in the horizontal plane. Consequently, as an example, and using the Cartesian coordinate system X, Y, Z indicated in FIG. 1, the storage container identified as 106' in FIG. 1 can be said to occupy storage position X=10, Y=2, Z=3. The container handling vehicles 201,301 can be said to travel in layer Z=0, and each storage column 105 can be identified by its X and Y coordinates.

The storage volume of the framework structure 100 has often been referred to as a grid 104, where the possible storage positions within this grid are referred to as storage cells. Each storage column may be identified by a position in an X- and Y-direction, while each storage cell may be identified by a container number in the X-, Y and Z-direction.

Each prior art container handling vehicle 201,301 comprises a storage compartment or space for receiving and stowing a storage container 106 when transporting the storage container 106 across the rail system 108. The storage space may comprise a cavity arranged centrally within the vehicle body 201a as shown in FIG. 2 and as described in e.g. WO2015/193278A1, the contents of which are incorporated herein by reference.

FIG. 3 shows an alternative configuration of a container handling vehicle 301 with a cantilever construction. Such a vehicle is described in detail in e.g. U.S. Pat. No. 317,366, the contents of which are also incorporated herein by reference.

The central cavity container handling vehicles 201 shown in FIG. 2 may have a footprint that covers an area with dimensions in the X and Y directions which is generally equal to the lateral extent of a storage column 105, e.g. as is described in WO2015/193278A1, the contents of which are incorporated herein by reference. The term 'lateral' used herein may mean 'horizontal'.

Alternatively, the central cavity container handling vehicles 101 may have a footprint which is larger than the lateral area defined by a storage column 105, e.g. as is disclosed in WO2014/090684A1.

The rail system 108 typically comprises rails with grooves in which the wheels of the vehicles run. Alternatively, the rails may comprise upwardly protruding elements, where the wheels of the vehicles comprise flanges to prevent derailing. These grooves and upwardly protruding elements are collectively known as tracks. Each rail may comprise one track, or each rail may comprise two parallel tracks.

WO2018/146304, the contents of which are incorporated herein by reference, illustrates a typical configuration of rail system 108 comprising rails and parallel tracks in both X and Y directions.

In the framework structure 100, a majority of the columns 105 are storage columns 105, i.e. columns 105 where storage containers 106 are stored in stacks 107. However, some columns 105 may have other purposes. In FIG. 1, columns 119 and 120 are such special-purpose columns used by the container handling vehicles 201,301 to drop off and/or pick up storage containers 106 so that they can be transported to an access station (not shown) where the storage containers 106 can be accessed from outside of the framework structure 100 or transferred out of or into the framework structure 100. Within the art, such a location is normally referred to as a 'port' and the column in which the port is located may be referred to as a 'port column' 119,120. The transportation to the access station may be in any direction, that is horizontal, tilted and/or vertical. For example, the storage containers 106 may be placed in a random or dedicated column 105 within the framework structure 100, then picked up by any container handling vehicle and transported to a port column 119,120 for further transportation to an access station. Note that the term 'tilted' means transportation of storage containers 106 having a general transportation orientation somewhere between horizontal and vertical.

In FIG. 1, the first port column 119 may for example be a dedicated drop-off port column where the container handling vehicles 201,301 can drop off storage containers 106 to be transported to an access or a transfer station, and the second port column 120 may be a dedicated pick-up port column where the container handling vehicles 201,301 can pick up storage containers 106 that have been transported from an access or a transfer station.

The access station may typically be a picking or a stocking station where product items are removed from or positioned into the storage containers 106. In a picking or a stocking station, the storage containers 106 are normally not removed from the automated storage and retrieval system 1, but are returned into the framework structure 100 again once accessed. A port can also be used for transferring storage containers to another storage facility (e.g. to another framework structure or to another automated storage and retrieval system), to a transport vehicle (e.g. a train or a lorry), or to a production facility.

A conveyor system comprising conveyors is normally employed to transport the storage containers between the port columns 119,120 and the access station.

If the port columns 119,120 and the access station are located at different levels, the conveyor system may comprise a lift device with a vertical component for transporting the storage containers 106 vertically between the port column 119,120 and the access station.

The conveyor system may be arranged to transfer storage containers 106 between different framework structures, e.g. as is described in WO2014/075937A1, the contents of which are incorporated herein by reference.

When a storage container 106 stored in one of the columns 105 disclosed in FIG. 1 is to be accessed, one of the container handling vehicles 201,301 is instructed to retrieve the target storage container 106 from its position and transport it to the drop-off port column 119. This operation involves moving the container handling vehicle 201,301 to a location above the storage column 105 in which the target storage container 106 is positioned, retrieving the storage container 106 from the storage column 105 using the container handling vehicle's 201,301 lifting device (not shown), and transporting the storage container 106 to the drop-off port column 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port column 119, or with one or a plurality of other cooperating container handling vehicles. Alternatively, or in addition, the automated storage and retrieval system 1 may have container handling vehicles 201,301 specifically dedicated to the task of temporarily removing storage containers 106 from a storage column 105. Once the target storage container 106 has been removed from the storage column 105, the temporarily removed storage containers 106 can be repositioned into the original storage column 105. However, the removed storage containers 106 may alternatively be relocated to other storage columns 105.

When a storage container 106 is to be stored in one of the columns 105, one of the container handling vehicles 201,301 is instructed to pick up the storage container 106 from the pick-up port column 120 and transport it to a location above the storage column 105 where it is to be stored. After any storage containers 106 positioned at or above the target position within the stack 107 have been removed, the container handling vehicle 201,301 positions the storage container 106 at the desired position. The removed storage containers 106 may then be lowered back into the storage column 105, or relocated to other storage columns 105.

For monitoring and controlling the automated storage and retrieval system 1, e.g. monitoring and controlling the location of respective storage containers 106 within the framework structure 100, the content of each storage container 106; and the movement of the container handling vehicles 201,301 so that a desired storage container 106 can be delivered to the desired location at the desired time without the container handling vehicles 201,301 colliding with each other, the automated storage and retrieval system 1 comprises a control system 500 which typically is computerized and which typically comprises a database for keeping track of the storage containers 106.

An objective of the invention may be to provide a lighter container handling vehicle without compromising on the maximum storage container weight the container handling vehicle can carry.

Furthermore, as there is a growing demand for container handling vehicles that can lift storage containers higher up from the top of the rail system compared to what has been done in the past, it may be a need for increased stability in order to account for this increased height.

An additional objective is to render possible lifting from increased depths in a grid.

SUMMARY OF THE INVENTION

The present invention is set forth and characterized in the independent claims, while the dependent claims describe other characteristics of the invention.

According to the present invention, the lifting mechanism including lifting device motor and lifting axles are moved out from the cantilever section such that only the guiding sheaves guiding the lifting bands down to the lifting frame are arranged in the cantilever section. The lifting bands can be spooled onto one or more lifting shafts arranged, preferably with the lifting motor to drive the one or more lifting shafts, closer to the wheels farthest away from the cantilever section in order to stabilize the robot and possibly moving weight downwards.

The invention relates to a container handling vehicle for operation on a two-dimensional rail system comprising a first set of parallel rails arranged to guide movement of container handling vehicles in a first direction X across the top of a frame structure, and a second set of parallel rails arranged perpendicular to the first set of rails to guide movement of the container handling vehicles in a second direction Y which is perpendicular to the first direction X, wherein the container handling vehicle comprises:

- a wheel base unit comprising first and second sets of wheels for guiding the container handling vehicle along the rail system in the first and second directions X, Y respectively;
- a support section extending vertically from the wheel base unit, the support section having a footprint with a horizontal extent;
- a cantilever section extending from the support section;
- a lifting frame suspended in a horizontal orientation from the cantilever section by a plurality of lifting bands, wherein the lifting frame comprises a releasable connection for connecting to a storage container;
- guiding sheaves provided in the cantilever section for guiding and supporting the plurality of lifting bands and the lifting frame;
- a lifting shaft for winding up and unwinding the plurality of lifting bands; and
- a lifting device motor for rotating the at least one lifting shaft, wherein a first and second wheel in a first pair of the first set of wheels are arranged closer to the cantilever section than a third and fourth wheel in a second pair of the first set of wheels, and wherein at least one of the lifting shaft for winding up and unwinding the plurality of lifting bands and the lifting device motor for rotating the at least one lifting shaft are arranged closer to the third and fourth wheel than the first and second wheel in the first set of wheels.

Preferably both the lifting shaft (or lifting shafts) and the lifting device motor are arranged closer to the third and fourth wheel than the first and second wheel in the first set of wheels.

Providing the lifting shaft closer to the third and fourth wheel than the first and second wheel in the first set of wheels renders possible lifting shafts with larger diameter compared to prior art container handling vehicles. Increasing the diameter of the lifting shaft results in less revolutions of the lifting bands when spooled onto the lifting shaft, which again results in less possible error resulting from uneven thickness or tension of the lifting bands onto the lifting shaft. Reduced diameter of the lifting shaft increases the revolutions onto the lifting shaft which may lead to skewed lifting of the lifting frame because the length of the lifting bands unwound from the lifting shaft may be different.

The first pair and second pair of wheels of the first set are the wheels which each have an axis of rotation that runs parallel to the extension direction of the cantilever section from the support section.

The first and second wheels are thus front wheels as they are closest to the cantilever section, while the third and fourth wheel are rear wheels as they are arranged at a longer distance from the cantilever section relative the first and second wheels. The first and second wheels (first pair of wheels of the first set) may be seen as positioned in a first third of the wheel base unit closest to the cantilever section, while the third and fourth wheels (second pair of wheels of the second set) may be seen as positioned in a second third of the wheel base unit farthest from the cantilever section.

Preferably the at least one lifting shaft for winding up and unwinding the plurality of lifting bands and a lifting device motor for rotating the at least one lifting shaft are arranged within a region of the container handling vehicle that is vertically aligned with the second third of the wheel base unit furthest from the cantilever section or is/are arranged in that second third of the wheel base unit. Preferably both the at least one lifting shaft and the lifting device motor are arranged within the region of the container handling vehicle that is vertically aligned with that second third of the wheel base unit or arranged in that second third of the wheel base unit.

Arranging the lifting shaft away from the cantilever section, render possible increased diameter of the lifting shaft compared to having the lifting shaft in the cantilever section. This provides additional advantage(s) in terms of: better precision in the lifting with regards to increased depth, better precision with regards to substantially horizontal lifting frame (i.e. prevents "skewed lifting") also at large depths, possibility of increasing the lifting depth, all as a result that the lifting will be less dependent on differences in thickness of the four lifting bands connected to each corner of the lifting frame. If the lifting bands have different thickness, the difference in lifting length of each lifting band increases per rotation of the lifting shaft. If lifting at increased depths, this difference will increase further. However, by increasing the diameter of the lifting shaft, the number of rotations of the four lifting bands are reduced, resulting in reduced difference of the four lifting band lengths.

In a preferred embodiment, at least one of the lifting shaft and the lifting device motor, preferably both, is arranged at a lower elevation than the cantilever section. This arrangement provides additional stabilization and counter weight relative the weight of a storage container carried by the lifting frame. For example, the at least one of the lifting shaft and the lifting device motor, preferably both, may be arranged at an elevation corresponding to a lower third of the support section.

In an alternative embodiment, however, at least one of the lifting shaft and the lifting device motor may be arranged at the substantially the same elevation as the cantilever section. This may allow fewer guiding devices to be required for guiding the lifting bands to the lifting shaft.

The support section extends between the wheel base unit and the cantilever section, and the cantilever section may be connected in an upper part of the support section.

A horizontal extent of the support section in the X and Y directions may be less than a horizontal extent of the wheel base unit in the X and Y directions. In preferred embodiments the horizontal extent of the support section in the X and Y directions is less than 25% of the horizontal extent of the wheel base unit in the X and Y directions. In some embodiments, the support section may be sufficiently narrow and/or configured to allow a storage container to be carried on a support surface arranged over the wheel base unit.

Alternatively, a horizontal extent of the support section in the X and Y directions may be equal to a horizontal extent of the wheel base unit in the X and Y directions.

The lifting bands may extend between the at least one lifting shaft and the guiding sheaves in the cantilever section via the support section and a number of guiding devices. These guiding device(s) come in addition to the guiding sheaves in the cantilever section. The guiding device(s) is typically a sheave(s) or shaft(s) on which two or more lifting bands are guided in order to achieve synchronous movement of the lifting bands and thus the lifting frame connected to them, or it may be a combination of sheave(s) and shaft(s). Preferably there are at least two guiding devices or shafts and these guide the lifting bands along a Z-shaped path to the lifting shaft. Other guiding devices than sheaves or shafts are possible as long as they provide the required function of guiding the lifting bands.

Alternatively, the lifting bands may extend uninterruptedly between the at least one lifting shaft and the guiding sheaves in the cantilever section. I.e. there may be no guiding devices arranged between the lifting shaft and the guiding sheaves in the cantilever section.

The container handling vehicle according to any of the preceding claims, wherein the cantilever section comprises at least one guiding sheave for guiding each of the lifting bands. Normally there will be four lifting bands and hence at least four guiding sheaves, where each of the lifting bands is connected at or close to a corner of the lifting frame. The lifting frame is normally rectangular. All four guiding sheaves may be arranged in the cantilever section. Alternatively, two guiding sheaves may be arranged in the cantilever section and two guiding sheaves may be arranged in the support section.

In order to further increase stability, at least one of the lifting shaft and the lifting device motor may be arranged within the wheel base unit or may project into the wheel base unit.

Arranging the weight of the at least one lifting shaft (which will also include the majority of the lifting bands when the lifting device is raised) and/or the lifting device motor as low as possible in addition to arranging the weight closer to the third and fourth wheels (the second pair of wheels of the first set), provides for a more effective counter-weight for a (heavy) storage container carried by the lifting frame.

In order to ensure simultaneous lifting of the lifting frame and thus preventing skewed lifting, all of the lifting bands can be winded up and un-winded on the same lifting shaft. By doing this, any additional synchronization necessary when winding and un-winding on two or more separate lifting shafts are prevented because the lifting bands will always be synchronized.

The support section may comprise a storage container support platform for supporting a storage container from below, where, when seen in a side view, the support platform has a smaller horizontal extent as the wheel base unit. The support section may extend vertically from a position ahead of the front wheels on the wheel base unit.

In order to reduce material weight of the cantilever section, the cantilever section may comprise an opening. The opening may also serve as an access opening through the cantilever section, namely from a position above the cantilever section to a position below the cantilever section.

The opening in the cantilever section may define an access perimeter. The lifting frame may have an opening defining an access perimeter. The access perimeter of the opening in the cantilever section may correspond in shape and alignment to the access perimeter of the opening in the lifting frame in order to allow access to items in the storage container through the respective openings when the lifting frame carrying a storage container is in a docked state adjacent the cantilever section.

The access perimeters of the openings in the cantilever section and the lifting frame may be substantially equal to an access perimeter of an opening in the storage container.

The cantilever section may comprise a pair of arms and at least one of the guiding sheaves may be connected at or close to a distal end of each arm at the end of the arms facing away from the wheel base unit.

The cantilever section may comprise a crosspiece connected at the distal end of each of the arms. The support section, the pair of arms and the crosspiece thus form an enclosure for the access perimeter of the opening in the cantilever section.

The opening in the cantilever section, the opening in the lifting frame and the opening in the top of a storage container carried by the lifting frame may have substantially equal vertical projection securing access from above the container handling vehicle to the interior of the storage container.

In another embodiment, the cantilever may comprise a plurality of apertures where material has been removed in order to reduce weight in the cantilever section.

In an aspect, the first and second sets of parallel rails form a grid which divides the rail system into a plurality of grid cells.

Thus, it is further described an automated storage and retrieval system comprising a two-dimensional rail system comprising a first set of parallel rails arranged to guide movement of container handling vehicles in a first direction X across the top of a frame structure, and a second set of parallel rails arranged perpendicular to the first set of rails to guide movement of the container handling vehicles in a second direction which is perpendicular to the first direction, wherein the automated storage and retrieval system further comprises a container handling vehicle as described above.

The relative terms "upper", "lower", "below", "above", "higher" etc. shall be understood in their normal sense and as seen in a cartesian coordinate system. When mentioned in relation to a well, "upper" or "above" shall be understood as a position closer to the surface of the well (relative to another component), contrary to the terms "lower" or "below" which shall be understood as a position further away from the surface of the well (relative another component).

Summarized, the invention as set forth in the claims has at least one of the following advantages over the known solutions:
- Relatively lighter cantilever section renders possible lifting heavier bins without added counterweight,
- Arranging the lifting shaft(s) away from the cantilever section, render possible increased diameter of the lifting shaft compared to having the lifting shaft in the cantilever section which provide additional advantage(s) in terms of: better precision in the lifting with regards to increased depth, better precision with regards to substantially horizontal lifting frame also at large depths, possibility of increasing the lifting depth.
- Relatively lighter cantilever section renders possible lighter container handling vehicle which can lift bins of the same weight,
- Better weight distribution in the robot,
- Possibly simplified construction as most of the drives, motor(s) etc. are arranged closer to each other, e.g. within the wheel base unit or close to the wheel base unit,
- Reduced risk of wire or electricity problems, and faster signal transmittance, as the cables can be made shorter when the components are closer to each other, If combined with an open lifting frame and an open cantilever section, the items in the storage container carried by the lifting frame is accessible from above,

BRIEF DESCRIPTION OF THE DRAWINGS

Following drawings are appended to facilitate the understanding of the invention. The drawings show embodiments of the invention, which will now be described by way of example only, where:

FIGS. 6A and 6B, where

DETAILED DESCRIPTION OF THE INVENTION

In the following, embodiments of the invention will be discussed in more detail with reference to the appended drawings. It should be understood, however, that the drawings are not intended to limit the invention to the subject-matter depicted in the drawings.

The framework structure 100 of the automated storage and retrieval system 1 is constructed in accordance with the prior art framework structure 100 described above in connection with FIGS. 1-3, i.e. a number of upright members 102 and a number of horizontal members 103, which are supported by the upright members 102, and further that the framework structure 100 comprises a first, upper rail system 108 in the X direction and Y direction.

The framework structure 100 further comprises storage compartments in the form of storage columns 105 provided between the members 102, 103, where storage containers 106 are stackable in stacks 107 within the storage columns 105.

The framework structure 100 can be of any size. In particular it is understood that the framework structure can be considerably wider and/or longer and/or deeper than disclosed in FIG. 1. For example, the framework structure 100 may have a horizontal extent of more than 700×700 columns and a storage depth of more than twelve containers.

Figure 3B:
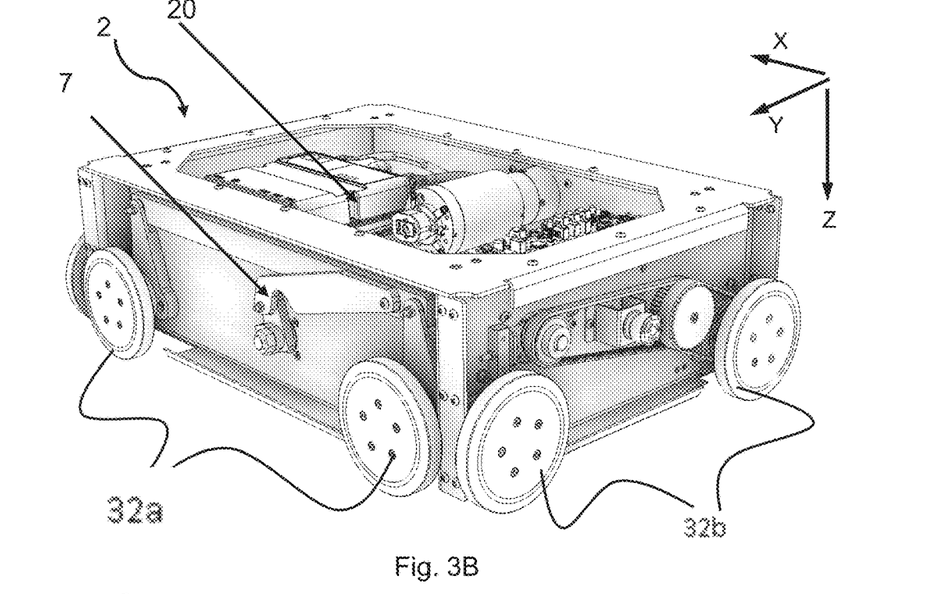
FIGS. 3B and 3C show an exemplary wheel base unit for the container handling vehicle.
Figure 3C:
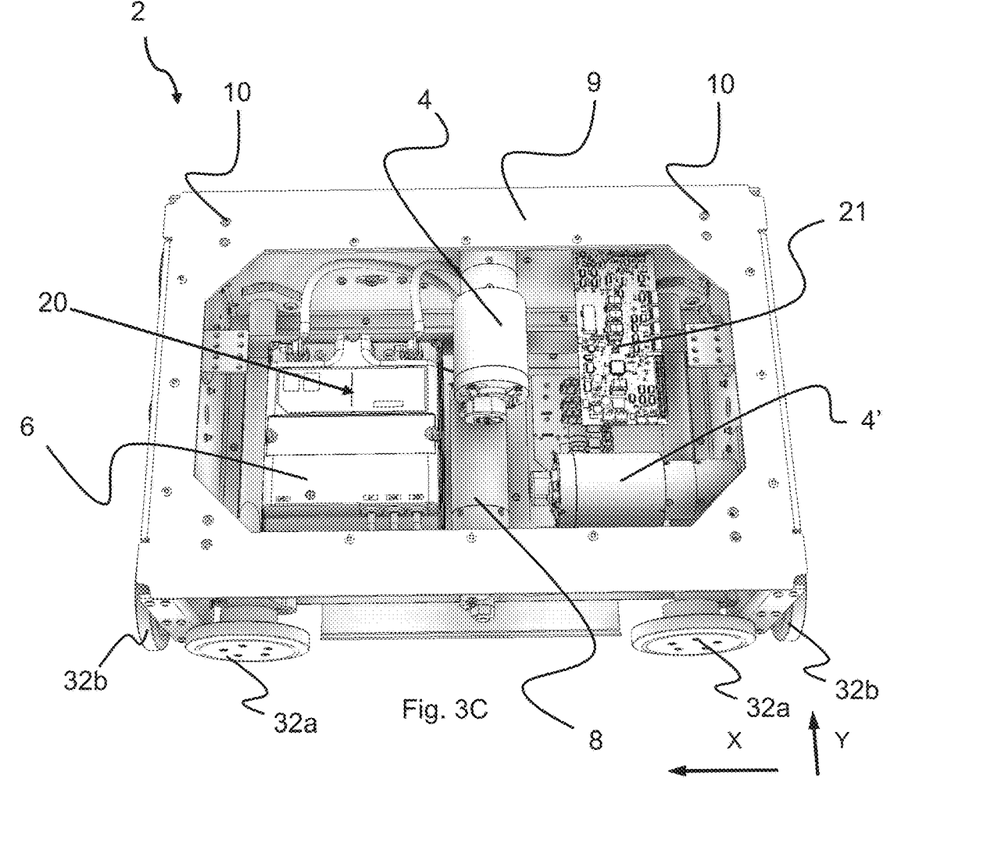

An exemplary wheel base unit for a remotely operated delivery vehicle 200 according to the invention is shown in FIGS. 3B and 3C. The wheel base unit 2 features a wheel arrangement 32a, 32b having a first set of wheels 32a for movement in a first direction upon a rail system and a second set of wheels 32b for movement in a second direction perpendicular to the first direction. Each set of wheels comprises two pairs of wheels arranged on opposite sides of the wheel base unit 2. To change the direction in which the wheel base unit may travel upon the rail system, one of the sets of wheels 32a is connected to a wheel displacement assembly 7. The wheel displacement assembly is able to lift and lower the connected set of wheels 32a relative to the other set of wheels 32b such that only the set of wheels travelling in a desired direction is in contact with the rail system. The wheel displacement assembly 7 is driven by an electric motor 8. Further, two electric motors 4,4', powered by a rechargeable battery 6, are connected to the set of wheels 32a,32b to move the wheel base unit in the desired direction.

Further referring to FIGS. 3B and 3C, the horizontal periphery of the wheel base unit 2 is dimensioned to fit within the horizontal area defined by a grid cell, such that two wheel base units 2 may pass each other on any adjacent grid cells of the rail system 108, 308. In other words, the wheel base unit 2 may have a footprint, i.e. an extent in the X and Y directions, which is generally equal to the horizontal area of a grid cell, i.e. the extent of a grid cell in the X and Y directions (e.g., as defined by the area of the grid opening plus a region around the grid opening taken up by a track of the rails), e.g. as is described in WO2015/193278A1, the contents of which are incorporated herein by reference.

Referring to FIG. 3C, the wheel base unit 2 has a top panel/flange 9 (i.e. an upper surface) configured as a connecting interface for the container carrier. The top panel 9 has a centre opening 20 and features multiple through-holes 10 (i.e. connecting elements) suitable for a bolt connection (or other fastener) via corresponding through-holes in a lower section of the container carrier. In other embodiments, the connecting elements of the top panel 9 may for instance be threaded pins for interaction with the through-holes of the lower section. The presence of a centre opening 20 is advantageous as it provides access to internal components of the wheel base unit 2, such as the rechargeable battery 6 and an electronic control system 21.

Figure 4A:
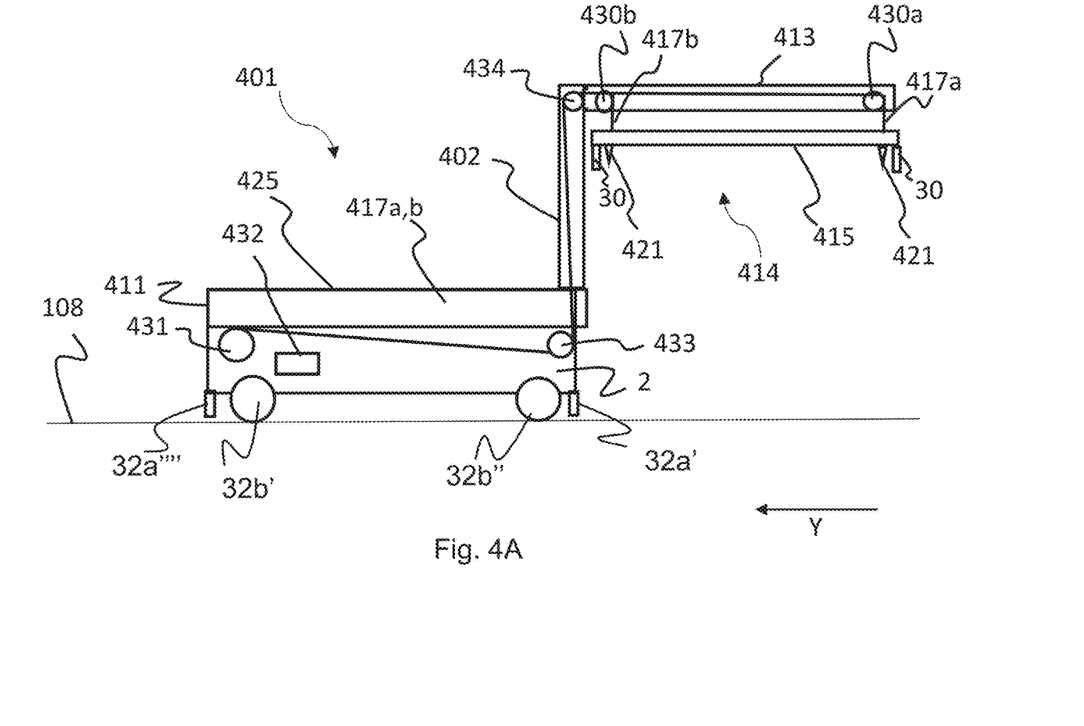
FIG. 4A is a side view of a first example of a container handling vehicle according to the invention.
Figure 4B:
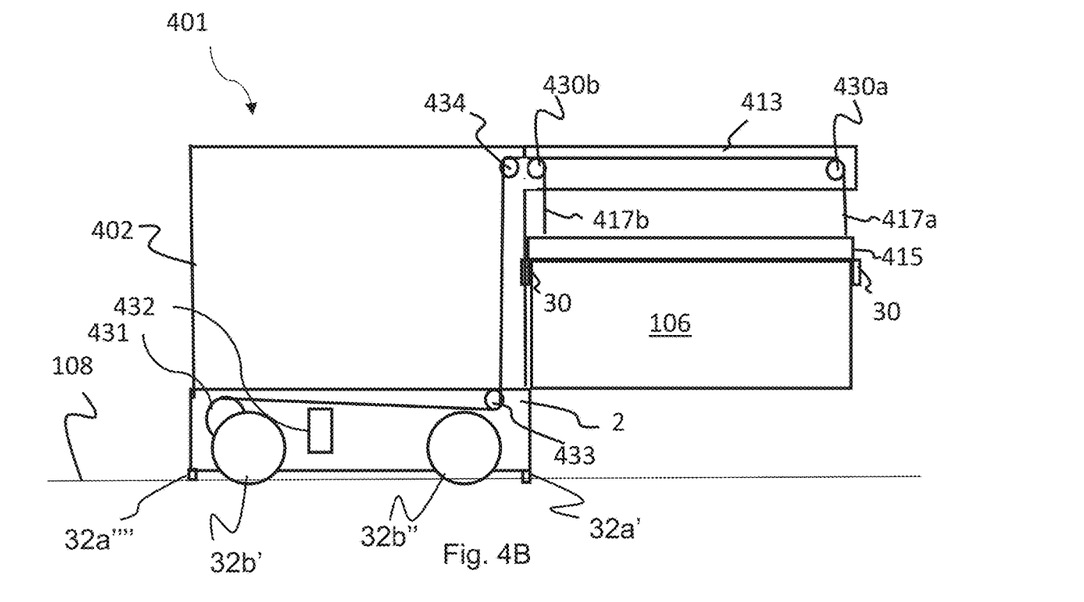
FIG. 4B is a side view of a second example of a container handling vehicle according to the invention.
Figure 4C:
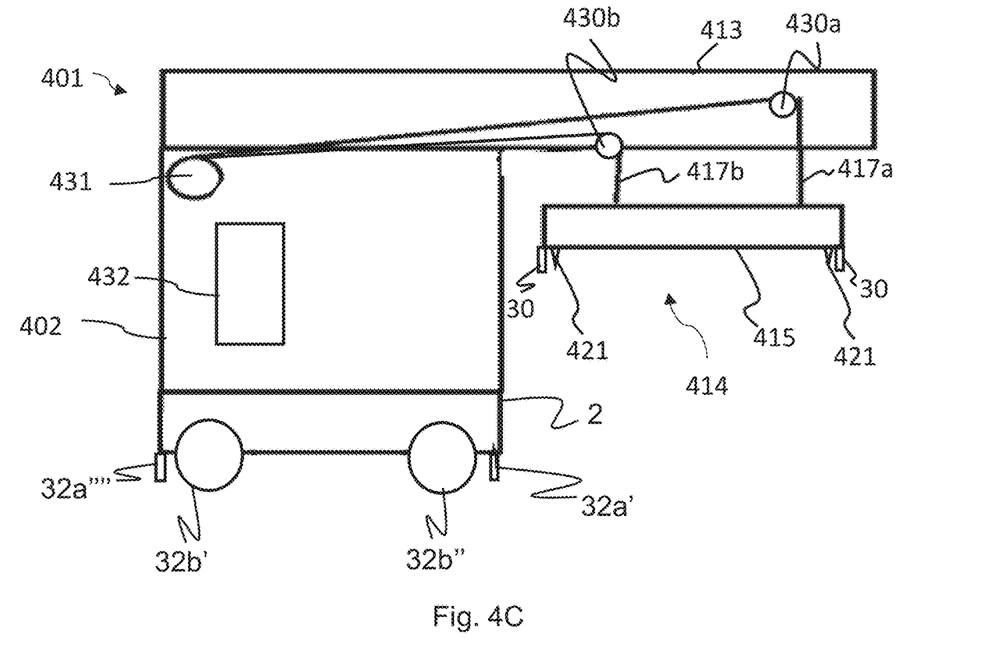
FIG. 4C is a side view of a third example of a container handling vehicle according to the invention.

Referring to FIGS. 4A, 4B and 4C side views of a first, second and third exemplary container handling vehicle 401 according to the invention are disclosed. The container handling vehicle 401 can operate on a two-dimensional rail system 108. Details of the rail system 108 is not shown in FIG. 4A, but is better illustrated in FIG. 1. The rail system may comprise a first set of parallel rails 110 arranged to guide movement of container handling vehicles 401 in a first direction X across the top of a frame structure 100, and a second set of parallel rails 111 arranged perpendicular to the first set of rails 110 to guide movement of the container handling vehicles 401 in a second direction Y which is perpendicular to the first direction X. The disclosed container handling vehicle 401 comprises a wheel base unit 2. The wheel base unit 2 comprising first and second sets of wheels 32a, 32b for guiding the container handling vehicle 401 along the rail system 108 in the first and second directions X, Y respectively.

The support section 402 preferably having a footprint with a horizontal extent which is equal to or smaller than the footprint of the wheel base unit 2. A cantilever section 413 is connected to the support section 402 and extends horizontally outside the footprint of the wheel base unit 2. A lifting frame 415, forming part of a lifting device 414, is suspended in a horizontal orientation from the cantilever section 413 by a plurality of lifting bands 417a,b. The lifting frame 415 comprises a releasable connection 421 in the form of grippers for connection to a storage container 106 and bin guides 30 for assisting in guiding the lifting frame 415 relative a storage container 106 such that the grippers are aligned relative the lift points (not shown) in the storage containers 106. The cantilever section 413 comprises guiding sheaves 430a, 430b for guiding and supporting the plurality of lifting bands 417a,b, respectively, and the lifting frame 415. Guiding sheaves 430a guide lifting bands 41a a, while guiding sheaves 430b guide lifting bands 417b.

The container handling vehicle 401 further comprising at least one lifting shaft 431 for winding up and unwinding the plurality of lifting bands 417a,b and a lifting device motor 432 for rotating the at least one lifting shaft 431. As indicated in FIGS. 4A-4C, at least one of the lifting shaft 431 and the lifting device motor 432 are arranged closer to the third and fourth wheel 32a''', 32a'''', i.e. the rearmost wheels or second pair of wheels, than the first and second wheel 32a', 32a'', i.e. the front wheels or first pair of wheels, in the first set of wheels 32b. This mutual setup of the wheels 32a',32a'',32a''',32a'''' relative the lifting shaft 431 and/or the lifting device motor 432, ensures that as much weight as possible is moved away from the cantilever section 413 such that lifting capacity of the container handling vehicles are not compromised if reducing weight of the container handling vehicles.

Figure 4D:
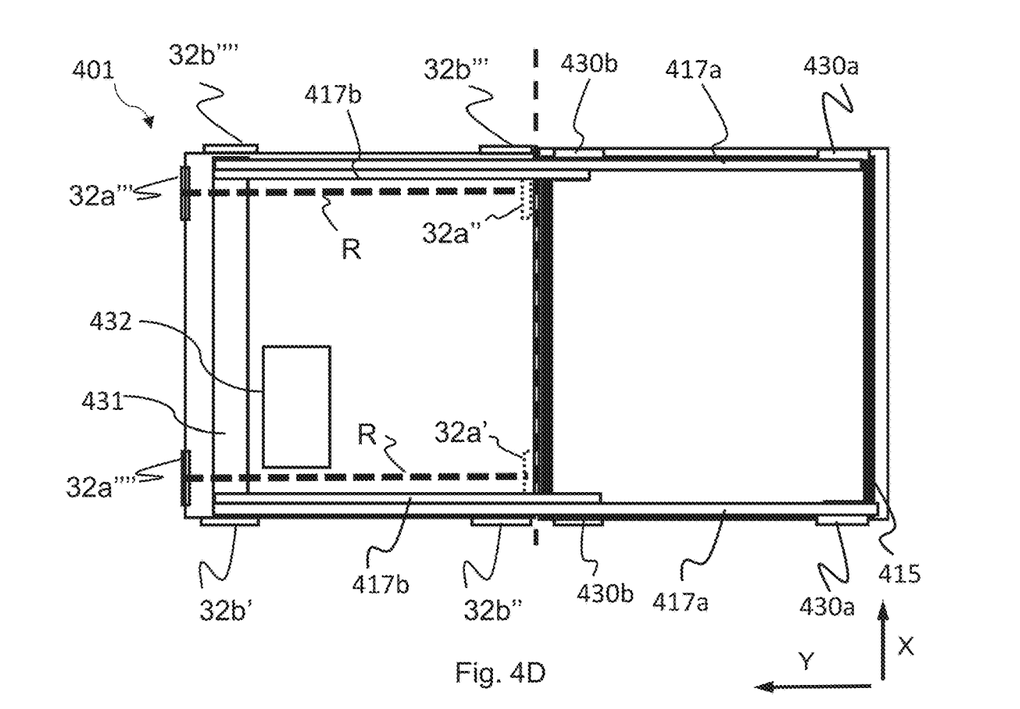
FIG. 4D is a top view of the container handling vehicle in FIGS. 4A-4C.

FIG. 4D is a top view of the container handling vehicle in FIGS. 4A-4C. As shown in FIG. 4D, details of the lifting bands 417a,417b and respective guiding sheaves 430a,430b in the cantilever section 413 are shown. As disclosed in FIG. 4D, guiding sheaves denoted 430a, i.e. the guiding sheaves arranged at a longer distance away from the wheel base unit 2 relative the guiding sheaves denoted 430b guide the lifting bands denoted 417a. The guiding sheaves denoted 430b arranged at a smaller distance from the wheel base unit 2 relative the guiding sheaves 430a guide the lifting bands denoted 41b. One end of the lifting bands 417a,417b are connected to the at least one lifting shaft 431 whereas the other end of the lifting band 417a,417b is connected to a corner of a lifting frame 415, respectively. Thus, the guiding sheaves 430a,430b in the cantilever section 413 guide and supports the plurality of lifting bands 417a,417b and the lifting frame 415 (and any storage container 106 carried by the lifting frame 415).

As is shown in FIG. 4D, the first and second wheel 32a', 32a'' form a first pair of wheels, i.e. the forwardmost wheels, and the third and fourth wheel 32a''', 32a'''' form a second pair of wheels, i.e. the rearmost wheels, of the first set of wheels. The first pair of wheels (first and second wheel 32a',32a'') are arranged closer to the cantilever section 413 than the second pair of wheels (third and fourth wheel 32a''', 32a'''') in the first set of wheels 32a. The first pair and second pair of wheels of the first set of wheels 32a are the wheels which each have an axis of rotation R that runs parallel to the extension direction of the cantilever section from the support section (see FIG. 4D).

The disclosed container handling vehicle 401 is comprises a total of eight wheels. Four wheels, i.e. first wheel 32a', second wheel 32a'', third wheel 32a''' and fourth wheel 32a'''', in the first set of wheels 32a, are directed in the X direction of the rail system. Similarly, a total of four wheels, i.e. first wheel 32b', second wheel 32b'', third wheel 32b''' and fourth wheel 32b'''', in the second set of wheels 32b, are directed in the Y direction of the rail system.

Although the exemplary container handling vehicles 401 in FIGS. 4A, 4B and 4C, have many common constructional features, there are some differences with regards to, for example:

the horizontal extent of the support section 402,
guiding of the lifting bands 417a,b between the at least one lifting shaft 431 and the guiding sheaves 430a,b in the cantilever section 413 as well as the number of required additional guiding devices or sheaves in the wheel base unit and/or support section required,
position of the lifting shaft 431 and lifting device motor 432 in the wheel base unit 2 or support section 432,
the container handling vehicle's possibility of carrying additional storage containers 106. These differences will be explained in greater detail in the following.

In FIG. 4A, a horizontal extent of the support section 402 in the X and Y directions is less than a horizontal extent of the wheel base unit 2 in the X and Y directions. This enables the possibility of making a storage container support platform 425 on top of the wheel base unit 2. In addition, both the lifting shaft 431 and the lifting device motor 432 are arranged at a lower elevation than the cantilever section 413, i.e. within the wheel base unit 2. Although both the lifting shaft 431 and the lifting device motor 432 are disclosed as being arranged within the wheel base unit 2, arranging only one of them within the wheel base unit 2 will also improve stability of the container handling vehicle 401. Arranging the lifting shaft 431 and/or the lifting device motor 432 at a lowermost elevation will further increase stability of the container handling vehicle 401. The lifting bands 417a, 417b extend between the at least one lifting shaft 432 and the guiding sheaves 430a, 430b in the cantilever section 413 via the support section 402 and a first guiding device 433 and a second guiding device 434. The first guiding device 433 is arranged in a part of the wheel base unit 2 or support section 402 closest to the cantilever section 413 in a lower part of the container handling vehicle 401 and the lifting bands 417a, 417b extending from the lifting shaft 431 enter the first guiding device 433 in a substantially horizontal orientation. This lower part can e.g. be within the wheel base unit 2 or in a lower portion of the support section 402. The lifting bands 417a, 417b are guided from the first guiding device 433 towards the second guiding device 434 in a substantially vertical orientation inside the support section 402. The second guiding device 434 is arranged at the substantially same elevation as the cantilever section 413 and is directed towards the guiding sheaves 430a, 430b in the cantilever section 413 in a substantially horizontal orientation. Lifting bands 417a extends to the guiding sheaves 417a connected at or close to distal ends of a pair of arms facing away from the wheel base unit 2. Although not shown in FIG. 4A, the container handling vehicle 401 is configured to lift a storage container 106 using the lifting frame 415 as well as simultaneously supporting a storage container 106 on the support platform 425. Thus, the container handling vehicle in FIG. 4A can transport two storage containers 106 at the time.

In FIG. 4B, a horizontal extent of the support section 402 in the X and Y directions is equal to a horizontal extent of the wheel base unit 2 in the X and Y directions. In addition, both the lifting shaft 431 and the lifting device motor 432 are arranged at a lower elevation than the cantilever section 413, i.e. within the support section 402. However, as disclosed in FIG. 4B, in order to further increase stability, at least one of the lifting shaft 431 and the lifting device motor 432 could be arranged within the wheel base unit 2. The lifting bands 417a, 417b extend between the at least one lifting shaft 432 and the guiding sheaves 430a, 430b in the cantilever section 413 via the support section 402 and a first guiding device 433 and a second guiding device 434. The first guiding device 433 is arranged in a part of the wheel base unit 2 or support section 402 closest to the cantilever section 413 in a lower part of the container handling vehicle 401 and the lifting bands 417a, 417b extending from the lifting shaft 431 enter the first guiding device 433 in a substantially horizontal orientation. This lower part can e.g. be within the wheel base unit 2 or in a lower portion of the support section 402. The lifting bands 417a, 417b are guided from the first guiding device 433 towards the second guiding device 434 in a substantially vertical orientation inside the support section 402. The second guiding device 434 is arranged at the substantially same elevation as the cantilever section 413 and is directed towards the guiding sheaves 430a, 430b in the cantilever section 413 in a substantially horizontal orientation. Lifting bands 417a extend to the guiding sheaves 417a connected at or close to the distal ends of a pair of arms facing away from the wheel base unit 2. The container handling vehicle in FIG. 4B lifts a storage container 106 by the lifting frame 415.

In FIG. 4C, a horizontal extent of the support section 402 in the X and Y directions is equal to a horizontal extent of the wheel base unit 2 in the X and Y directions. In addition, the lifting shaft 431 is arranged at the substantially same elevation as the cantilever section 413. The lifting bands 417a, 417b extend uninterruptedly between the at least one lifting shaft 431 and the guiding sheaves 430a,b. Although not shown in FIG. 4C, the container handling vehicle 401 is configured to lift a storage container 106 using the lifting frame 415.

Figure 5:
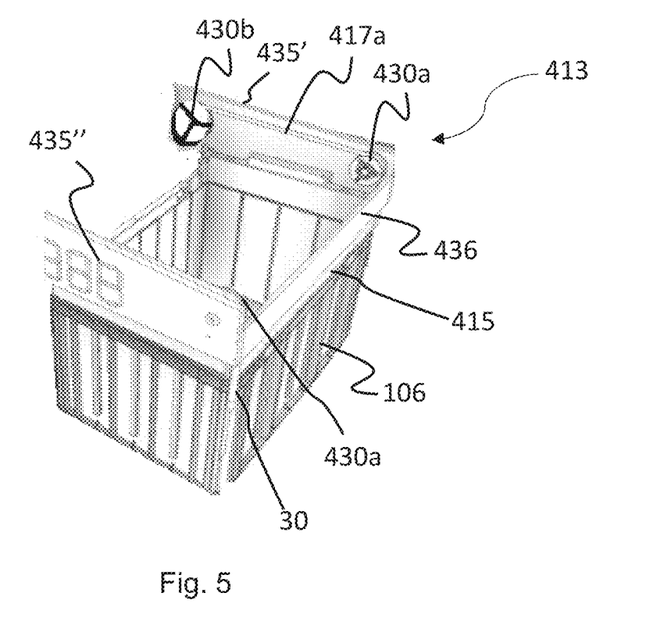
FIG. 5 shows details of a possible cantilever section provided with an opening and a lifting frame provided with an opening, and where the openings are vertically aligned relative the opening of a storage container 106 docked against the cantilever section.

FIG. 5 shows details of a possible cantilever section 413 provided with an opening and a lifting frame 415 provided with an opening, and where the openings are vertically aligned relative the opening of a storage container 106 docked against the cantilever section 413. The opening in the cantilever section 413 defines an access perimeter, and the lifting frame 415 has an opening which defines an access perimeter. The access perimeter of the opening in the cantilever section 413 corresponds in shape and alignment to the access perimeter of the opening in the lifting frame 415 thereby allowing access to items in the storage container 106 through the respective openings when the lifting frame 415 is in a docked state adjacent the cantilever section 413. As shown in FIG. 5, the cantilever section 413 comprises a pair of arms 435',435". Two of the guiding sheaves 430a are connected at or close to a distal end of each arm 435',435" at the end facing away from the wheel base unit (not shown). The cantilever section 413 in FIG. 5 is further disclosed with a crosspiece 436 connected at the distal end of each of the arms 435',435".

Figure 6A:
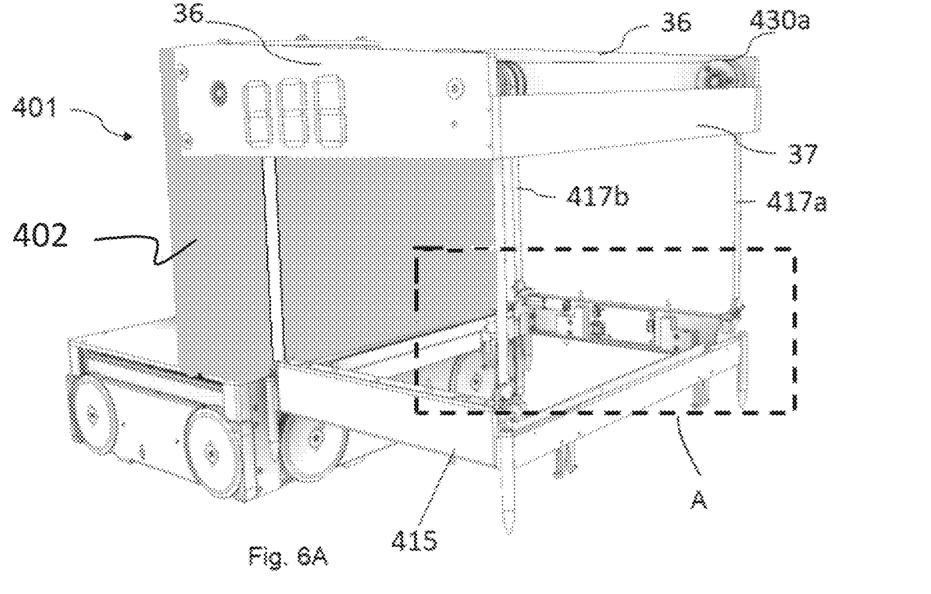
Figure 6B:
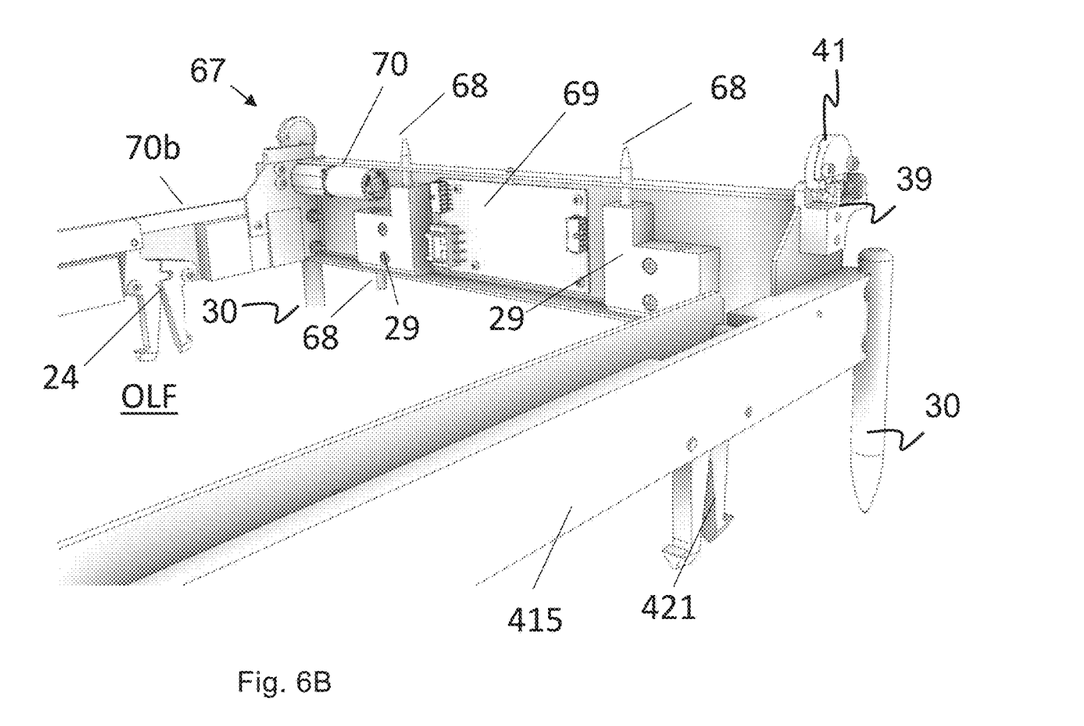
FIG. 6B is an enlarged view of the lifting frame in section A in FIG. 6A, and which figures are modified versions of FIGS. 6E and 6F in International application WO 2020/094339 A1, disclose an open lifting frame and an example of a possible setup of a mutual arrangement of the different components of the lifting frame in order to achieve an open lifting frame.

Referring to FIGS. 6A and 6B, where FIG. 6B is an enlarged view of the lifting frame in section A in FIG. 6A, and which figures are modified versions of FIGS. 6E and 6F in International application WO 2020/094339 A1, it is disclosed an open lifting frame and an example of a possible setup of a mutual arrangement of the different components of the lifting frame in order to achieve an open lifting frame. The lifting bands are made of metal (commonly a steel alloy) and are used to conduct signals and electric power to end switch modules 29 and a control module 69 arranged within the outer boundary of the lifting frame 415. The end switch modules 29 comprises spring-loaded pins 68 for detecting when the lifting frame 415 is in contact with a storage container 106 and when the lifting frame 415 is in the docked state against the cantilever section 413. To avoid short-circuiting the signal/electric power passing through the lifting bands, at least parts of the bracket 39 is made in a non-conducting material, such as a suitable plastic or composite material, such that the lifting bands are only in electric contact (via wires not shown) with the lifting frame 415 at the control module 69. Thus, at least parts of the lifting band clamp 41 is made in an electrically conductive material, e.g. any suitable metal. In alternative embodiments, the lifting bands may for instance be used for power transfer only, while signals to the end switch modules 29 and control module 69 are transferred wirelessly or via a separate cable.

Each end switch module 29 is electrically connected (wires not shown but located in the lifting frame), via the control module 69 to two lifting band clamps 41 (or band connector hubs) having a different potential, such that signals/electric power may be received from, or sent to, a main control unit (not shown) inside the container-handling vehicle 401.

The control module 69 is also connected to and controls gripper motors 70 which are also arranged inside the lifting frame 415 to drive the gripper elements 421 via gripper bar 70b. Bin guides 30 in each corner of the lifting frame 415 assist in guiding and aligning the grippers 421 correctly relative the lift points in storage containers 106.

In the preceding description, various aspects of the container handling vehicle and the automated storage and retrieval system according to the invention have been described with reference to the illustrative embodiment. For purposes of explanation, specific numbers, systems and configurations were set forth in order to provide a thorough understanding of the system and its workings. However, this description is not intended to be construed in a limiting sense. Various modifications and variations of the illustrative embodiment, as well as other embodiments of the system, which are apparent to persons skilled in the art to which the disclosed subject matter pertains, are deemed to lie within the scope of the present invention.

LIST OF REFERENCE NUMBERS

1 Prior art automated storage and retrieval system
2 Wheel base unit/Vehicle base
4, 4' Electric motor
6 Rechargeable battery
7 Wheel displacement assembly
8 Electric motor for wheel displacement assembly
9 Top panel/flange
10 Through-holes
20 Centre opening
21 Electronic control system
29 Switch module
30 Bin guides
32a Wheel arrangement, first set of wheels
32a'-32a" First, second, third, fourth wheel in first set of wheels
32b Wheel arrangement, second set of wheels
32b'-32b"" First, second, third, fourth wheel in second set of wheels
39 Bracket
41 Lifting band clamp
68 Spring-loaded pins
69 Control module 70 controls gripper motors
70b Gripper bar
100 Framework structure
102 Upright members of framework structure
103 Horizontal members of framework structure
104 Storage grid
105 Storage column
106 Storage container
106' Particular position of storage container
107 Stack
108 Rail system
110 Parallel rails in first direction (X)
110a First rail in first direction (X)
110b Second rail in first direction (X)
111 Parallel rail in second direction (Y)
111a First rail of second direction (Y)
11 1b Second rail of second direction (Y)
112 Access opening
119 First port column
120 Second port column
201 Prior art storage container vehicle
201a Vehicle body of the storage container vehicle 201
201b Drive means/wheel arrangement, first direction (X)
201c Drive means/wheel arrangement, second direction (Y)
301 Prior art cantilever storage container vehicle
301a Vehicle body of the storage container vehicle 301
301b Drive means in first direction (X)
301c Drive means in second direction (Y)
304 Gripping device
402 Support section
413 Cantilever section
414 Lifting device
415 Lifting frame
417a,b Lifting bands
421 Releasable connection, gripper
425 Support platform
430a Guiding sheave for guiding lifting bands 417a
430b Guiding sheave for guiding lifting bands 417b
431 Lifting shaft
432 Lifting device motor
433 First guiding device
434 Second guiding device
435', 435" Arm
436 Crosspiece
500 Control system
R Axis of rotation first and second pair of wheels
X First direction
Y Second direction
Z Third direction

The invention claimed is:

1. A container handling vehicle for operation on a two-dimensional rail system comprising a first set of parallel rails arranged to guide movement of container handling vehicles in a first direction across the top of a frame structure, and a second set of parallel rails arranged perpendicular to the first set of rails to guide movement of the container handling vehicles in a second direction which is perpendicular to the first direction, wherein the container handling vehicle comprises:
a wheel base unit comprising first and second sets of wheels for guiding the container handling vehicle along the rail system in the first and second directions respectively;
a support section extending vertically from the wheel base unit, the support section having a footprint with a horizontal extent; and
a cantilever section extending from the support section;
a lifting frame suspended in a horizontal orientation from the cantilever section by a plurality of lifting bands, wherein the lifting frame comprises a releasable connection for connecting to a storage container;
four guiding sheaves, wherein the guiding sheaves are provided in the cantilever section and wherein each of the guiding sheaves is arranged for guiding and supporting one of the plurality of lifting bands and the lifting frame;
a lifting shaft for winding up and unwinding the plurality of lifting bands; and
a lifting device motor for rotating the lifting shaft;
wherein a first wheel and a second wheel in a first pair of wheels in the first set of wheels are arranged closer to the cantilever section than a third wheel and a fourth wheel in a second pair of wheels of the first set of wheels,
and wherein at least one of the lifting shaft and the lifting device motor is arranged closer to the third and fourth wheels than the first and second wheels in the first set of wheels, and
wherein at least one of the lifting shaft and the lifting device motor is arranged within the wheel base unit.

2. The container handling vehicle according to claim 1, wherein the first and second wheels are positioned in a first third of the wheel base unit closest to the cantilever section, while the third and fourth wheels are positioned in a second third of the wheel base unit farthest from the cantilever section.

3. The container handling vehicle according to claim 2, wherein the lifting shaft and the lifting device motor are arranged in the second third of the wheel base unit.

4. The container handling vehicle according to claim 1, wherein the cantilever section is connected to an upper part of the support section.

5. The container handling vehicle according to claim 1, wherein a horizontal extent of the support section in the first and second directions is less than a horizontal extent of the wheel base unit in the first and second directions.

6. The container handling vehicle according to claim 1, wherein the lifting bands extend between the plurality of lifting shaft and the four guiding sheaves in the cantilever section via the support section and a number of guiding devices.

7. The container handling vehicle according to claim 1, wherein all of the lifting bands are winded up and un-winded on the same lifting shaft.

8. The container handling vehicle according to claim 1, wherein the support section comprises a storage container support platform for supporting a storage container from below, wherein the support platform has a smaller horizontal extent than the wheel base unit.

9. The container handling vehicle according to claim 1, wherein the cantilever section comprises an opening.

10. The container handling vehicle according to claim 9, wherein the opening defines an access perimeter, and wherein the lifting frame has an opening defining an access perimeter, and wherein the access perimeter of the opening in the cantilever section corresponds in shape and alignment to the access perimeter of the opening in the lifting frame to allow access to items in the storage container through the respective openings when the lifting frame carrying a storage container is in a docked state adjacent the cantilever section.

11. The container handling vehicle according to claim 10, wherein the cantilever section comprises a pair of arms and wherein at least one of the guiding sheaves is connected at or close to a distal end of each arm at the end facing away from the wheel base unit.

12. The container handling vehicle according to claim 11, wherein the cantilever section comprises a crosspiece connected at the distal end of each of the arms.

13. The container handling vehicle according to claim 10, wherein the opening in the cantilever section, the opening in the lifting frame and an opening in the top of a storage container carried by the lifting frame have substantially equal vertical projections, thereby securing access from above the container handling vehicle to an interior of the storage container.

14. An automated storage and retrieval system comprising a two-dimensional rail system comprising a first set of parallel rails arranged to guide movement of container handling vehicles in a first direction across the top of a frame structure, and a second set of parallel rails arranged perpendicular to the first set of rails to guide movement of the container handling vehicles in a second direction which is perpendicular to the first direction, wherein the automated storage and retrieval system further comprises a container handling vehicle comprising:
　a wheel base unit comprising first and second sets of wheels for guiding the container handling vehicle along the rail system in the first and second directions respectively;
　a support section extending vertically from the wheel base unit, the support section having a footprint with a horizontal extent; and
　a cantilever section extending from the support section;
　a lifting frame suspended in a horizontal orientation from the cantilever section by a plurality of lifting bands, wherein the lifting frame comprises a releasable connection for connecting to a storage container;
　four guiding sheaves, wherein the guiding sheaves are provided in the cantilever section and wherein each of the guiding sheaves is arranged for guiding and supporting one of the plurality of lifting bands and the lifting frame;
　a lifting shaft for winding up and unwinding the plurality of lifting bands; and
　a lifting device motor for rotating the at least one lifting shaft;
　wherein a first wheel and a second wheel in a first pair of wheels in the first set of wheels are arranged closer to the cantilever section than a third wheel and a fourth wheel in a second pair of wheels of the first set of wheels,
　and wherein at least one of the lifting shaft and the lifting device motor is arranged closer to the third and fourth wheels than the first and second wheels in the first set of wheels, and
　wherein at least one of the lifting shaft and the lifting device motor is arranged within the wheel base unit.

15. The automated storage and retrieval system according to claim 14, wherein the framework structure further comprises storage compartments in the form of storage columns provided between members, wherein storage containers are stackable in stacks within the storage columns, and wherein access perimeters of openings in the cantilever section and the lifting frame are substantially equal to an access perimeter of an opening in a storage container.

16. A container handling vehicle for operation on a two-dimensional rail system comprising a first set of parallel rails arranged to guide movement of container handling vehicles in a first direction across the top of a frame structure, and a second set of parallel rails arranged perpendicular to the first set of rails to guide movement of the container handling vehicles in a second direction which is perpendicular to the first direction, wherein the container handling vehicle comprises:
　a wheel base unit comprising first and second sets of wheels for guiding the container handling vehicle along the rail system in the first and second directions respectively;
　a support section extending vertically from the wheel base unit, the support section having a footprint with a horizontal extent; and
　a cantilever section extending from the support section;
　a lifting frame suspended in a horizontal orientation from the cantilever section by a plurality of lifting bands, wherein the lifting frame comprises a releasable connection for connecting to a storage container;
　four guiding sheaves, wherein the guiding sheaves are provided in the cantilever section and wherein each of the guiding sheaves is arranged for guiding and supporting one of the plurality of lifting bands and the lifting frame;
　a lifting shaft for winding up and unwinding the plurality of lifting bands; and
　a lifting device motor for rotating the lifting shaft;
　wherein a first wheel and a second wheel in a first pair of wheels in the first set of wheels are arranged closer to the cantilever section than a third wheel and a fourth wheel in a second pair of wheels of the first set of wheels;
　wherein at least one of the lifting shaft and the lifting device motor is arranged closer to the third and fourth wheels than the first and second wheels in the first set of wheels;
　wherein the first and second wheels are positioned in a first third of the wheel base unit closest to the cantilever section, while the third and fourth wheels are positioned in a second third of the wheel base unit farthest from the cantilever section; and
　wherein the lifting shaft and the lifting device motor are arranged within a region of the container handling vehicle that is vertically aligned with the second third of the wheel base unit furthest from the cantilever section.

17. The container handling vehicle according to claim 16, wherein the cantilever section is connected to an upper part of the support section.

18. The container handling vehicle according to claim 16, wherein a horizontal extent of the support section in the first and second directions is less than a horizontal extent of the wheel base unit in the first and second directions.

19. The container handling vehicle according to claim 16, wherein the cantilever section comprises an opening.

20. The container handling vehicle according to claim 16, wherein the opening defines an access perimeter, and wherein the lifting frame has an opening defining an access perimeter, and wherein the access perimeter of the opening in the cantilever section corresponds in shape and alignment to the access perimeter of the opening in the lifting frame to allow access to items in the storage container through the respective openings when the lifting frame carrying a storage container is in a docked state adjacent the cantilever section.

* * * * *